United States Patent
Maisonnier et al.

(10) Patent No.: US 8,997,599 B2
(45) Date of Patent: Apr. 7, 2015

(54) MOTORIZED JOINT WITH TWO PIVOT CONNECTIONS AND HUMANOID ROBOT WHICH IMPLEMENTS THE JOINT

(75) Inventors: Bruno Maisonnier, Paris (FR); Pascal Lafourcade, Toulouse (FR); Romain Fischesser, Montreuil (FR)

(73) Assignee: Aldebaran Robotics, Paris (FR)

( * ) Notice: Subject to any disclaimer, the term of this patent is extended or adjusted under 35 U.S.C. 154(b) by 182 days.

(21) Appl. No.: 12/736,449

(22) PCT Filed: Apr. 6, 2009

(86) PCT No.: PCT/EP2009/054082
§ 371 (c)(1),
(2), (4) Date: Nov. 9, 2010

(87) PCT Pub. No.: WO2009/124904
PCT Pub. Date: Oct. 15, 2009

(65) Prior Publication Data
US 2011/0048158 A1    Mar. 3, 2011

(30) Foreign Application Priority Data

Apr. 9, 2008   (FR) ...................................... 08 01953

(51) Int. Cl.
*B25J 17/00*    (2006.01)
*B25J 17/02*    (2006.01)

(52) U.S. Cl.
CPC ............ *B25J 17/0275* (2013.01); *Y10S 901/25* (2013.01); *Y10S 901/26* (2013.01)

(58) Field of Classification Search
CPC ............... B25J 17/0266; B25J 17/0283; B25J 17/0275; B25J 17/0258; B25J 17/025; B25J 17/00; B25J 17/0208; B25J 17/0241; B25J 17/02; B25J 17/0291
USPC ............... 74/490.01, 490.03, 490.05, 490.06; 414/738, 739, 744.5; 901/25, 26
See application file for complete search history.

(56) References Cited

U.S. PATENT DOCUMENTS 4,338,038 A  *  7/1982  Cloarec ........................... 403/56
4,480,495 A  *  11/1984  Obama ....................... 74/490.05
(Continued)

FOREIGN PATENT DOCUMENTS

EP            1 207 024 A1      5/2002

OTHER PUBLICATIONS

International Search Report dated Jul. 7, 2009.

*Primary Examiner* — William Kelleher
*Assistant Examiner* — Valentin Craciun
(74) *Attorney, Agent, or Firm* — Locke Lord LLP; Scott D. Wofsy

(57) ABSTRACT

A motorized joint having two degrees of freedom in rotation connecting two elements is provided. The joint includes two pivot connections such that a first one of the pivot connections establishes a first pivot axis, and a second one of the pivot connections establishes a second pivot axis. The first pivot axis is not parallel to the second pivot axis. A first motor is disposed in fixed relation to a first one of the two elements and has a drive shaft aligned with a first drive axis so as to cause by means of a first speed reducer with parallel axes the two elements to rotate about the first pivot axis. A second motor having a second drive shaft aliened with a second drive axis parallel to the first drive axis of the first motor is affixed to an output portion of the first speed reducer for axial rotation therewith about the first pivot axis so as to cause by means of a second speed reducer including a bevel gear relative rotational movement of the two elements with respect to one another about the second pivot axis. Also, the joint may be implemented as part of a humanoid robot.

6 Claims, 6 Drawing Sheets

(56) References Cited

U.S. PATENT DOCUMENTS

| | | | |
|---|---|---|---|
| 4,512,710 A * | 4/1985 | Flatau | 414/735 |
| 4,579,016 A * | 4/1986 | Soroka et al. | 74/661 |
| 4,624,621 A * | 11/1986 | Murakami et al. | 414/735 |
| 4,828,453 A * | 5/1989 | Martin et al. | 414/738 |
| 4,831,893 A * | 5/1989 | Obama et al. | 74/490.05 |
| 4,900,997 A * | 2/1990 | Durand et al. | 318/568.2 |
| 5,046,914 A * | 9/1991 | Holland et al. | 414/706 |
| 5,132,601 A * | 7/1992 | Ohtani | 318/568.1 |
| 5,410,944 A * | 5/1995 | Cushman | 91/520 |
| 5,437,490 A * | 8/1995 | Mimura et al. | 294/106 |
| 5,580,209 A * | 12/1996 | Ogawa et al. | 414/729 |
| 5,901,613 A * | 5/1999 | Forslund | 74/490.03 |
| 5,967,580 A | 10/1999 | Rosheim | |
| 6,969,385 B2 * | 11/2005 | Moreyra | 606/1 |
| 7,127,962 B2 * | 10/2006 | Angeles et al. | 74/490.05 |
| 2002/0173226 A1 * | 11/2002 | Carlson, III | 451/5 |
| 2003/0192391 A1 * | 10/2003 | Uematsu et al. | 74/490.06 |
| 2006/0201275 A1 * | 9/2006 | Ono | 74/490.01 |
| 2011/0048158 A1 * | 3/2011 | Maisonnier et al. | 74/490.03 |
| 2011/0067514 A1 * | 3/2011 | Long | 74/420 |
| 2011/0106302 A1 * | 5/2011 | Long | 700/245 |
| 2014/0197652 A1 * | 7/2014 | Wang et al. | 294/185 |
| 2014/0224058 A1 * | 8/2014 | Tanaka et al. | 74/490.05 |

\* cited by examiner

MOTORIZED JOINT WITH TWO PIVOT CONNECTIONS AND HUMANOID ROBOT WHICH IMPLEMENTS THE JOINT

BACKGROUND OF THE INVENTION

The invention relates to a motorized joint with two pivot connections, and a humanoid robot which implements the joint. The invention is particularly useful in the production of humanoid robots, the ergonomics of which it is wished to improve.

Robots of this type are equipped with numerous joints which make it possible to move different parts of the body of the robot, such as the head or the limbs. Certain joints of the human body, such as the shoulder, the elbow or the neck can be reproduced in a robot by means of a joint comprising two pivot connections, which are also known as double pivot connections. More specifically, the outlet from the first pivot connection forms the inlet to the second pivot connection. For example, at the elbow, the forearm is articulated relative to the arm such as to permit a first rotation of the forearm around an axis according to which the forearm extends, as well as a second rotation around an axis which is at right-angles to the first axis. In other words, the forearm has two degrees of freedom in rotation relative to the arm.

In a robot, the joints are motorized for example by means of rotary electric motors, which each make it possible to control a degree of freedom in rotation. In a joint with two axes at right-angles, as previously described, it is therefore necessary to have two motors, which each control a rotation. In order to create this joint, it is possible to align the motors with the respective axes of rotation. This arrangement is simple to implement, but in the case of the elbow for example, one of the motors must project in relation to the joint. This protuberance impedes certain movements of the robot.

In addition, in order for the robot to be able to place its arms along its body, the protuberances formed by the motors at the elbows must extend towards the exterior of the body. The protuberances are placed symmetrically relative to a vertical axis which forms the vertebral column of the robot. This arrangement requires the joints to be symmetrical also. The joints cannot be identical, which therefore reduces the standardization of the mechanical parts which constitute the robot.

The object of the invention is to eliminate some or all of these problems, by dispensing with the protuberance necessitated by the motor. In general, the invention makes it possible to improve the compactness of joints comprising two pivot connections.

For this purpose, the subject of the invention is a joint comprising two pivot connections, the axes of which are not parallel, a first motor which drives a first one of the two pivot connections by means of a first speed reducer, and a second motor which drives a second one of the two pivot connections by means of a second speed reducer, characterized in that one of the two reducers comprises a bevel gear between the motor and the pivot connection which are associated by this reducer.

BRIEF SUMMARY OF THE INVENTION

The object of the invention is also a humanoid robot comprising at least one joint according to the invention.

BRIEF DESCRIPTION OF THE DRAWINGS

The invention will be better understood, and other advantages will become apparent, by reading the detailed description of several embodiments provided by way of example, which description is illustrated by the attached drawing, in which.

For the sake of clarity, the same elements will bear the same references in the different figures.

The invention is described in relation to an elbow of a humanoid robot. The invention is not limited to this elbow, and it will be appreciated that it is possible to implement it for any motorized double pivot connection joint, notably for other joints of a humanoid robot, such as the neck or the shoulders.

Figure 1:
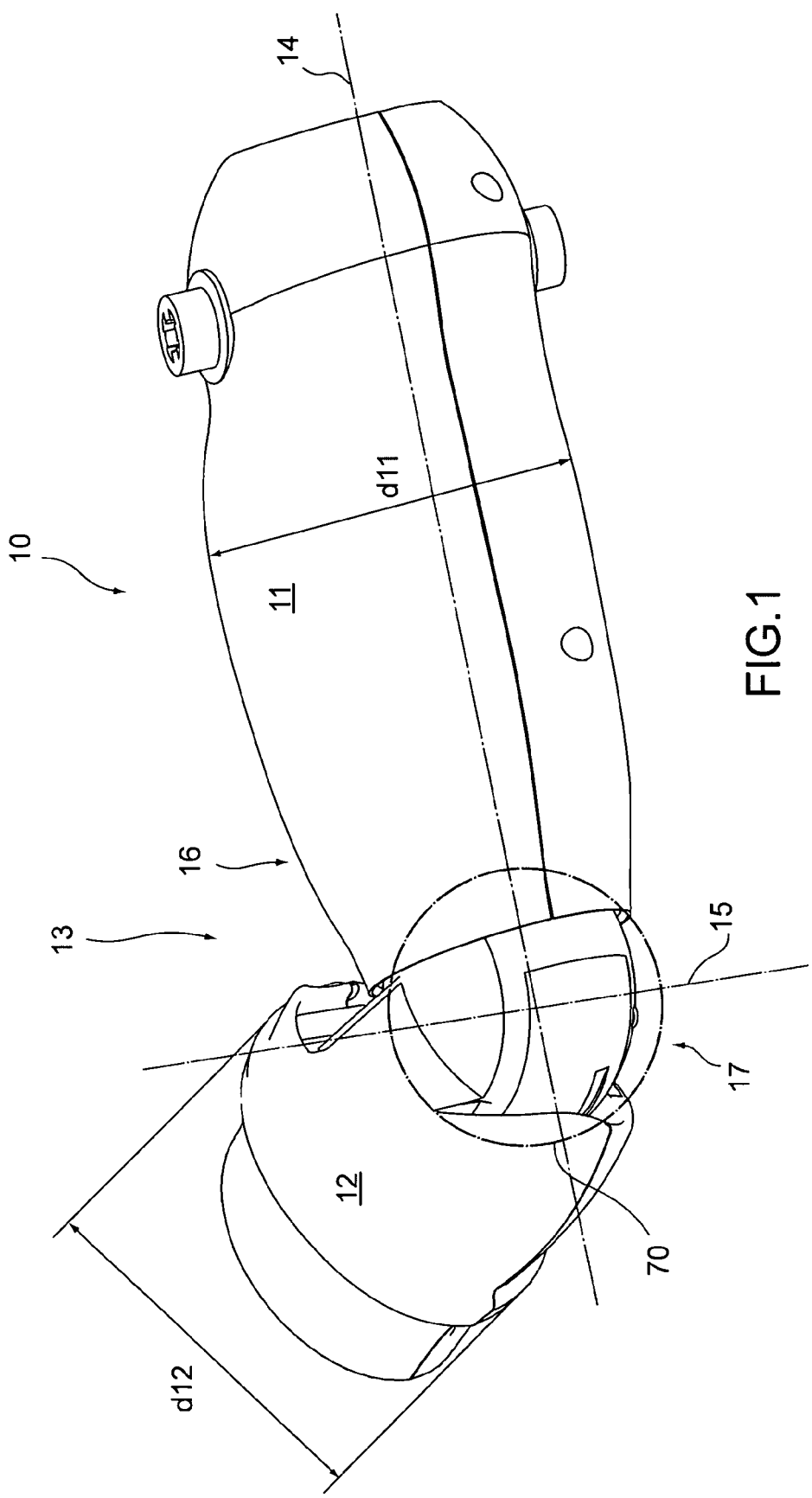
FIG. 1 represents a joint which forms an elbow of a humanoid robot.

FIG. 1 represents a part of an upper limb 10 of a humanoid robot. The upper limb 10 comprises an arm 11 and a forearm 12. A joint 13 allows the forearm 12 to move relative to the arm 11 according to two axes of rotation. A first axis 14 extends according to a main direction of the forearm 11, and a second axis 15 is at right-angles to the axis 14. The joint 13 comprises two pivot connections 16 and 17. The pivot connection 16 permits rotation of the forearm 12 around the axis 14, and the pivot connection 17 permits rotation of the forearm 12 around the axis 15. In FIG. 1, the pivot connections 16 and 17 are partly concealed by a casing of the arm 11 and of the forearm 12. The configuration according to which the axes 14 and 15 are at right-angles is preferred. It will be appreciated that in order to implement the invention, it is possible to produce a joint wherein the axes 14 and 15 are not convergent. In general the invention can be implemented for axes 14 and 15 which are not parallel.

DETAILED DESCRIPTION OF THE INVENTION

Figure 2:
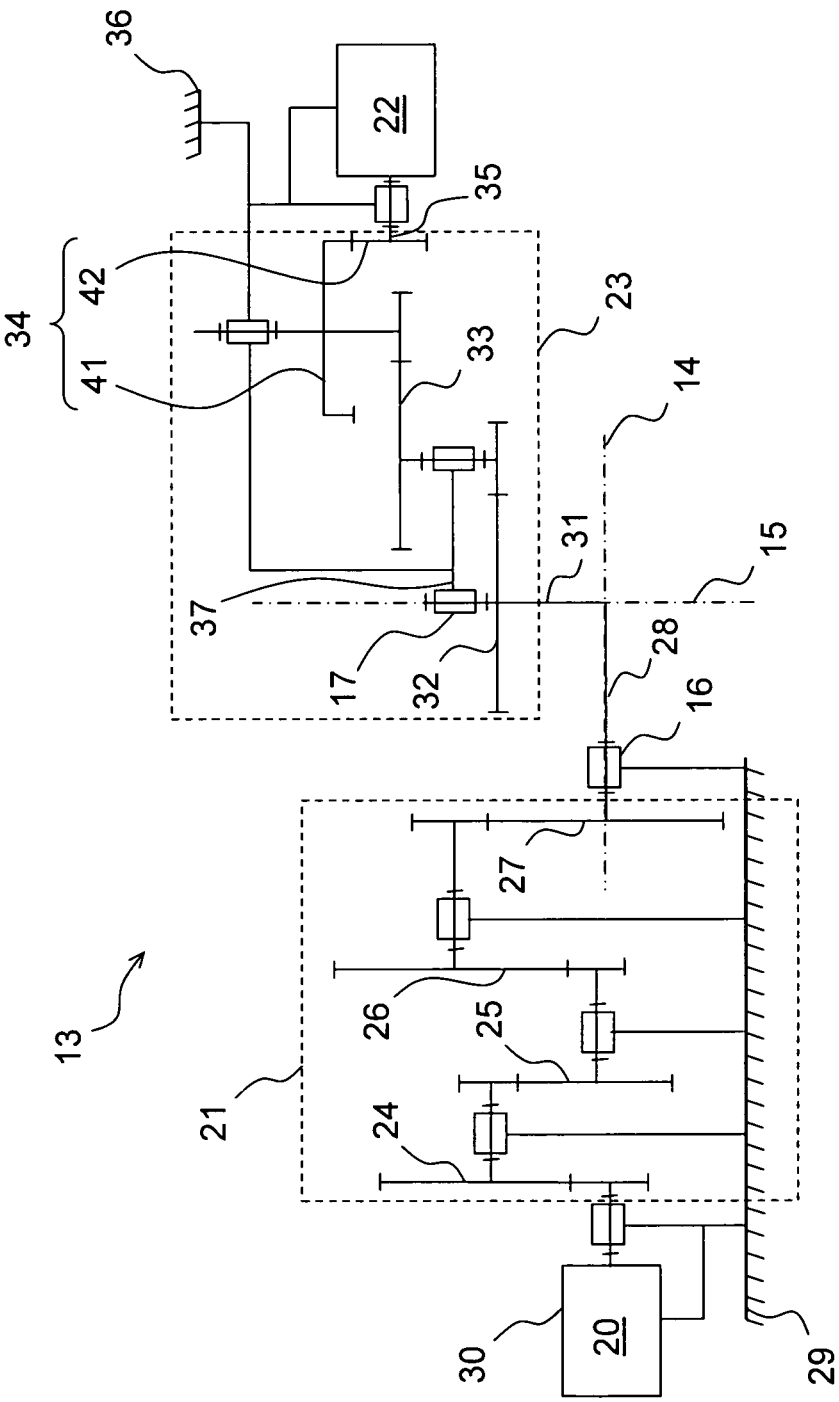
FIG. 2 represents a kinematic diagram of a first embodiment of the invention.

FIG. 2 represents a kinematic diagram of a first embodiment of the invention. The joint 13 comprises a first motor 20 which drives the pivot connection 16 by means of a first speed reducer 21, and a second motor 22 which drives the pivot connection 17 by means of a second speed reducer 23.

The motors 20 and 22 are rotary. They can be of any type, and can for example be direct current electric motors.

The speed reducer 21 has parallel axes. It comprises a plurality of straight gear trains. In the example represented, four gear trains 24 to 27 succeed one another in order to obtain the required reduction ratio. The motor 20 drives the train 24, and an output shaft 28 of the gear train 27 forms a rotary part of the pivot connection 16. A fixed part of the pivot connection 16 is formed by a support structure 29 of the arm 11. A stator 30 of the motor 20 is also integral with the support structure 29. The rotation of the motor 20 makes it possible to control, in the pivot connection 16, by means of the reducer 21, the different parameters of the movement of the shaft 28 relative to the support structure 29, i.e. the angular position, the speed, and the torque. The motor 20 thus controls the movement of the forearm 11 around the axis 14.

The output shaft 28 of the reducer 21 is also integral with a mobile part 31 which forms an output shaft of the reducer 23.

The shaft 28 extends according to the axis 14 and the mobile part 31 extends according to the axis 15. In the configuration described, the mobile part 31 is thus perpendicular to the shaft 28. The reducer 23 comprises two straight gear trains 32 and 33, as well as a gear train 34 which forms a bevel gear towards an output shaft 35 of the motor 22. The bevel gear 34 makes it possible to align the motor 22 with a support structure 36 of the forearm 12. More specifically, an output shaft 35 of the motor 22 extends according to a longitudinal direction of the forearm 12. The bevel gear 34 makes it possible to prevent the motor 22 from being aligned with the axis 15. In fact, the forearm 12 extends substantially perpendicularly to the axis 15. Advantageously, the bevel gear 34 provides substantially a right-angle between the axis 15 of the pivot connection 17 and the output shaft 35 of the motor 22. A fixed part 37 of the pivot connection 17 is integral with the support structure 36. The rotation of the motor 22 makes it possible to control, in the pivot connection 17, by means of the reducer 23, the movement of the mobile part 31 relative to a fixed part 37 of the pivot connection 17, and thus the movement of the forearm 11 around the axis 15.

Figure 3:
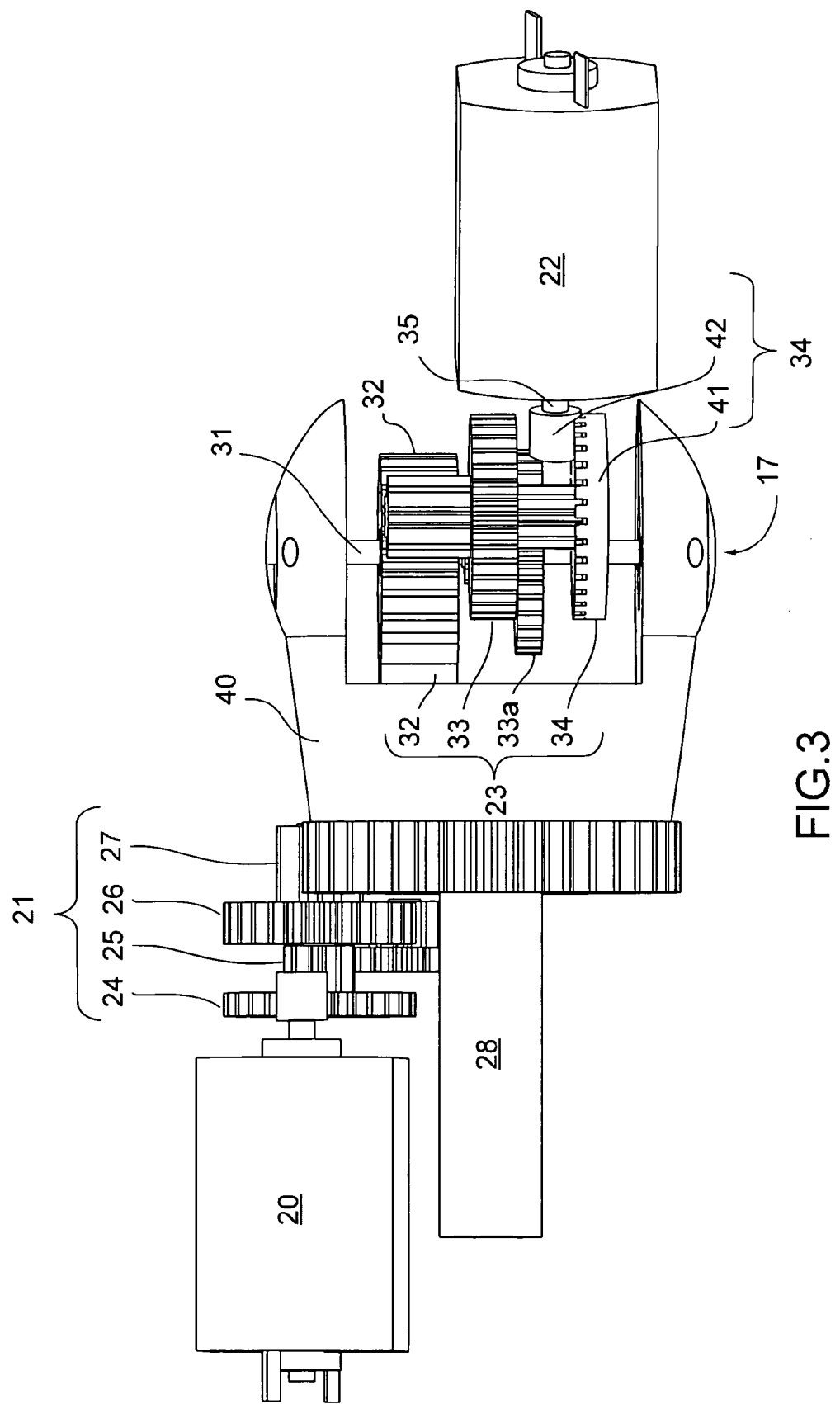
FIG. 3 represents an embodiment of main parts of the joint schematized in FIG. 2.

FIG. 3 represents an embodiment of main parts of the joint schematized in FIG. 2. It shows the motor 20 driving the shaft 28 by means of the reducer 21. In order to avoid excessive complication in FIG. 3, in the pivot connection 16 only the shaft 28 is shown: the joint also comprises a bearing, not shown, which permits rotation and guiding of the shaft 28 relative to the support structure 29. The shaft 28 is integral with a fork 40 in which the shaft 31, which forms the mobile part of the pivot connection 17, is immobilized. FIG. 3 also shows the motor 22 and the reducer 23. In this figure, the reducer comprises four gear trains, including the bevel gear 34. An additional stage 33a of a train of straight gears is added in comparison with the kinematic diagram in FIG. 2. The number of gear trains is unimportant in the implementation of the invention. It depends on the reduction ratio required for the reducer concerned.

The bevel gear 34 advantageously comprises a face gear 41 associated with a pinion 42, which for example is integral with the output shaft 35 of the motor 22. The use of a face gear 41 has several advantages in comparison with the use of conical gears, in order to provide a bevel gear. Conical gears have a limited reduction ratio, they are sensitive to faults of alignment of their axes, and have a production cost which is higher than for the association of a face gear and a straight pinion. The association of a face gear and a straight pinion also makes it possible to eliminate the axial forces which are generated by conical gears.

The speed reducers 21 and 23 can have substantial reduction ratios of approximately 150 to 200, in order to permit accurate control of minor movements of the forearm 12. It is advantageous for the reducers 21 and 23 to be reversible, in order to be able to make the forearm 12 move by means of action on the exterior of the robot, without damaging the reducers 21 and 23. For this purpose, it is possible to use gears produced based on a plastic such as polyamide, filled with polytetrafluoroethylene, so as to limit friction between the gears in contact. It is also possible to fill the base material by means of carbon fibers, in order to improve the mechanical characteristics of the reducers 21 and 23.

Figure 4:
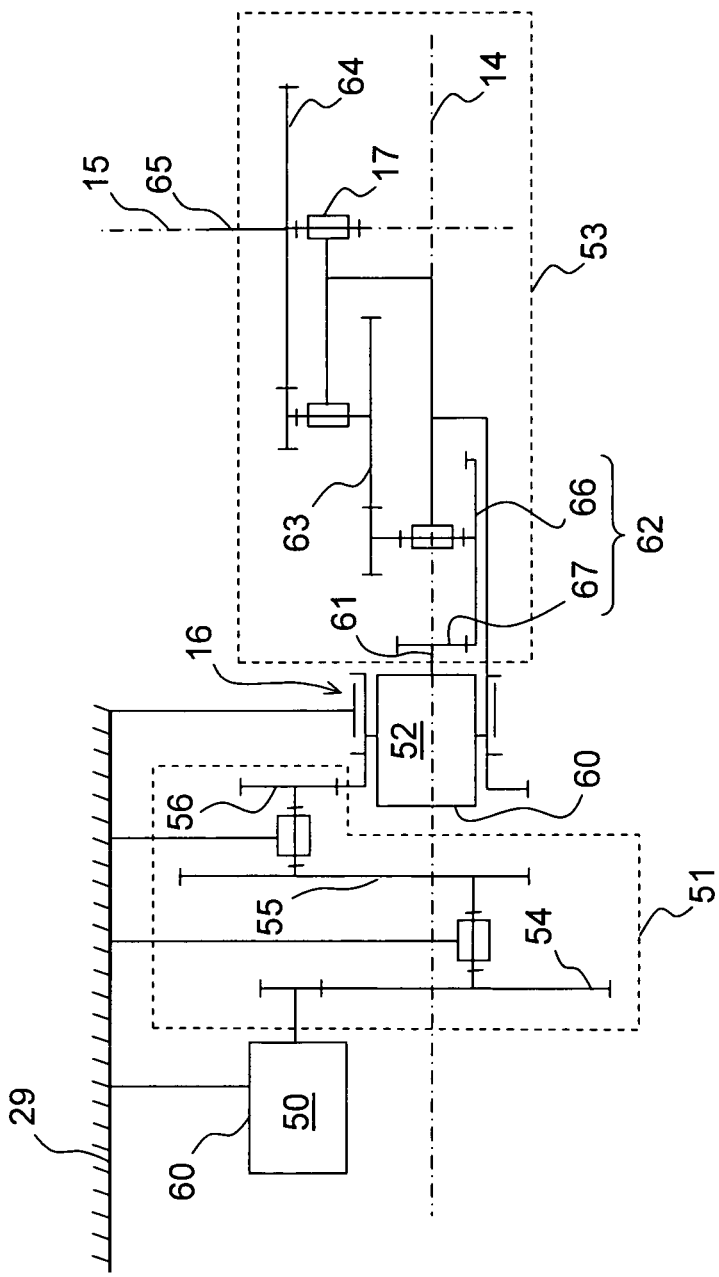
FIG. 4 represents a kinematic diagram of a second embodiment of the invention.

FIG. 4 shows a kinematic diagram of a second embodiment of the invention. The joint 13 comprises a first motor 50 which drives the pivot connection 16 by means of a first speed reducer 51, and a second motor 52 which drives the pivot connection 17 by means of a second speed reducer 53.

The motors 50 and 52 are similar to the motors 20 and 22. The speed reducer 51 has parallel axes. It comprises for example three successive straight gear trains 54 to 56. The motor 50 drives the train 54 and the gear train 56 drives a stator 60 of the motor 52. The stator 60 forms a rotary part of the pivot connection 16. A fixed part of the pivot connection 16 is formed by a support structure 29 for the arm 11. As previously described, the rotation of the motor 50 makes it possible to control, in the pivot connection 16, by means of the reducer 51, the angular position of the forearm 11 around the axis 14. The stator 60 of the motor 52 is integral with the output axis 14 of the reducer 51.

An output shaft 61 of the motor 52 forms the input of the reducer 53, comprising a bevel gear 62 followed by two straight gear trains 63 and 64. An output shaft 65 of the train 64 forms the mobile part of the pivot connection 17. The output shaft 65 is integral with the support structure 36 for the forearm 12. As previously described, the bevel gear 62 can provide substantially a right-angle between the axis 15 of the pivot connection 17, according to which the motor 52 rotates, and the output shaft 65 of the reducer 53. The fixed part of the pivot connection 17 is integral with the stator 60 of the motor 52. The axis of rotation of the motor 52 is parallel to the axis of rotation of the motor 50.

In this embodiment, none of the motors 50 and 51 or the reducers 51 and 53 is situated in the forearm 12. All the electrical controls for the motors 50 and 51 can be placed in the arm 11. It is thus possible to limit the electrical wiring which passes via the joint 13. This variant also makes it possible to reduce the inertia of the joint. In fact, in relation to the support structure 29 for the arm, the stator 60 of the motor 52 rotates only around the axis 14 of its output shaft 61.

Figure 5:
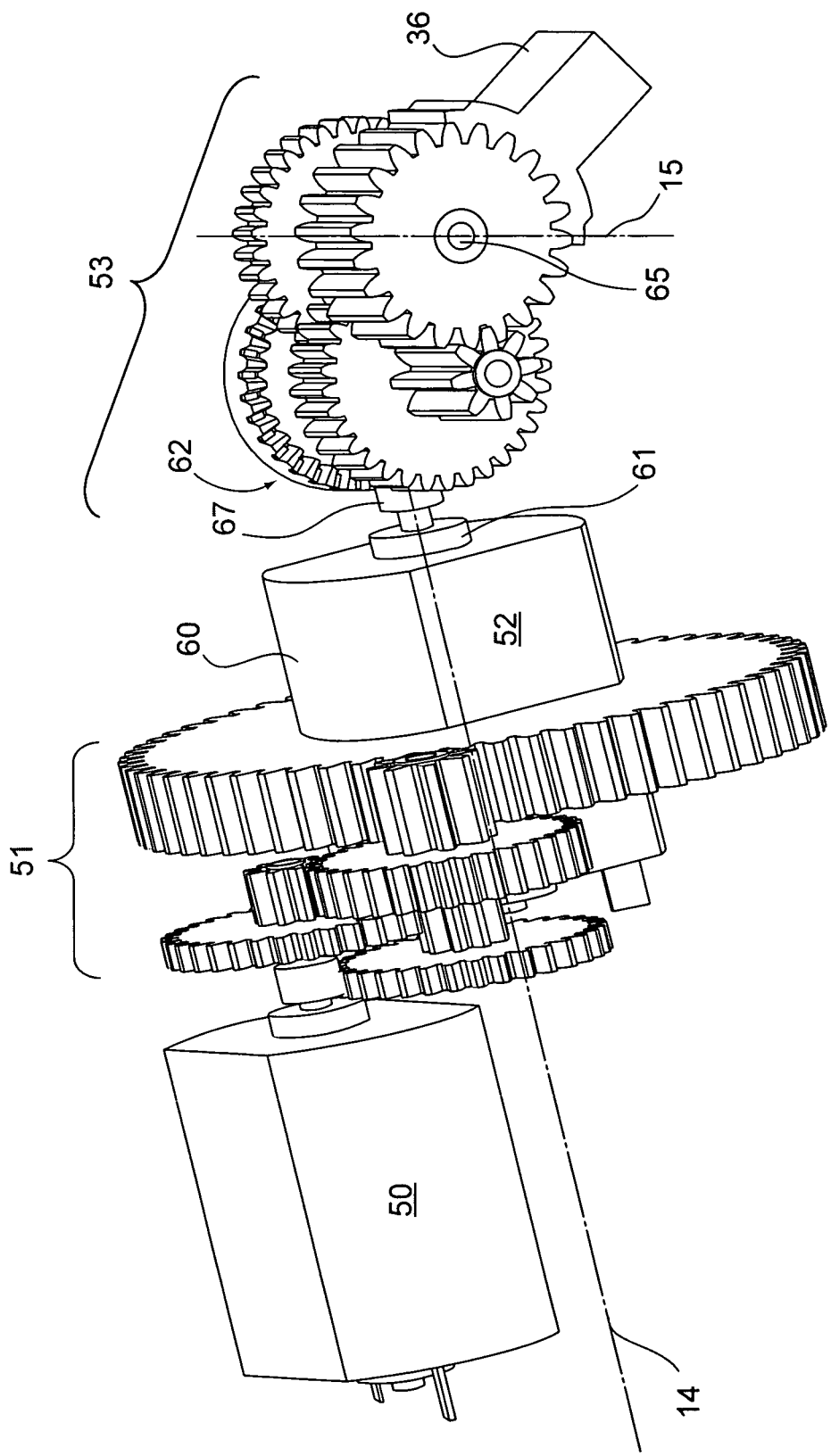
FIG. 5 represents an embodiment of main parts of the joint schematized in FIG. 4.

FIG. 5 shows an embodiment of main parts of the joint schematized in FIG. 4. It shows the motor 50 driving the stator 60 of the motor 52 by means of the reducer 51 in rotation around the axis 14. The motor 52 drives the shaft 65 and the support structure by means of the reducer 53 in rotation around the axis 15. As previously described, the bevel gear 62 can comprise a face gear 66 which is driven by a straight pinion 67 which is integral with the output shaft 61 of the motor 52.

In the two embodiments, the reducers 21, 23, 51 and 53 each comprise several straight gear trains, which can be replaced in each reducer by a planetary gear train. This type of train is generally more compact than a series of straight gear trains for large reduction ratios.

Figure 6:
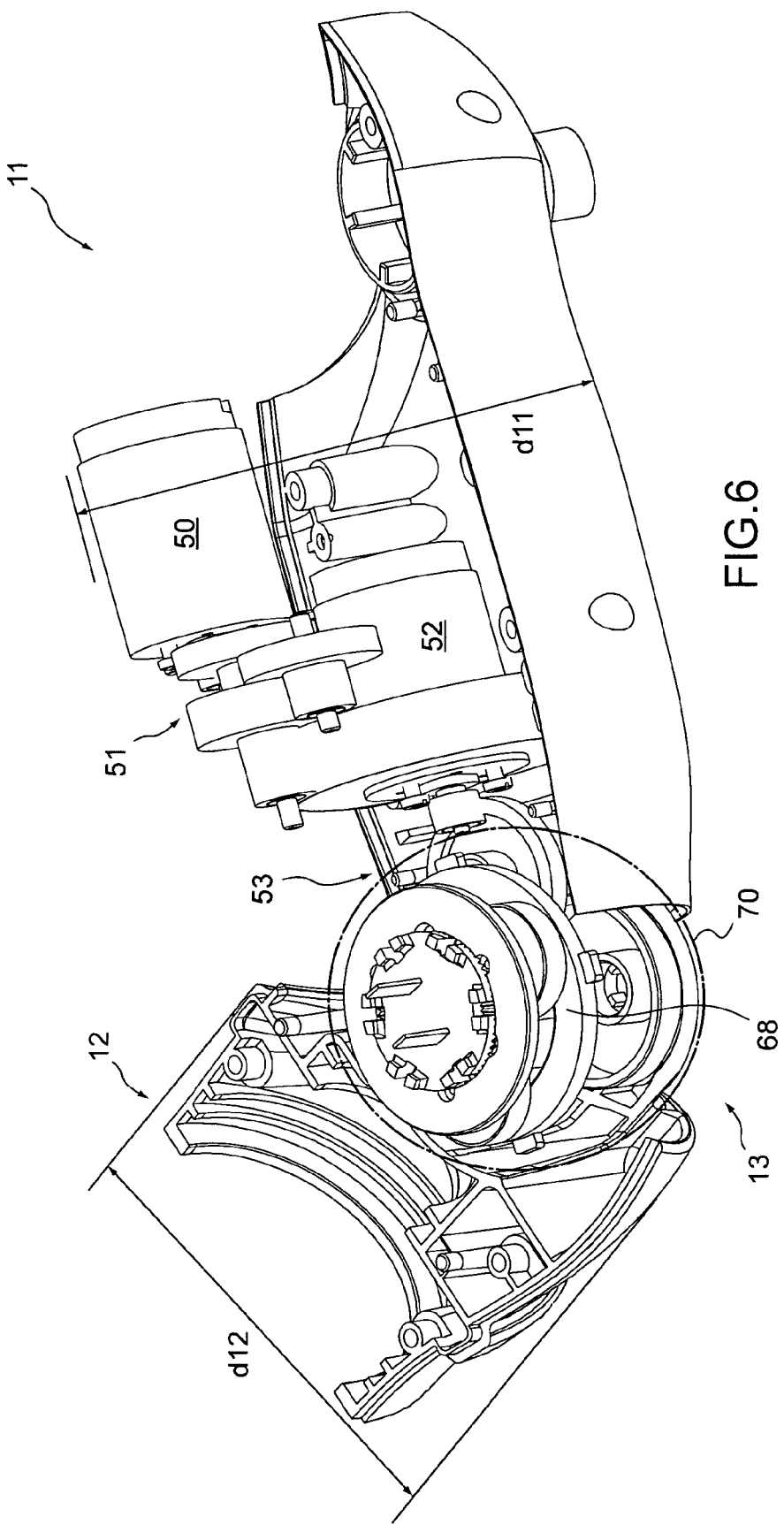
FIG. 6 represents a variant of the joint of the second embodiment, assembled in its environment, and a reducer of which comprises a planetary gear train.

FIG. 6 shows a variant of the joint 13 of the second embodiment, assembled in its environment. The motors 50 and 52, as well as the reducer 51, are disposed inside the arm 11. Only the reducer 53 can be seen between the casing of the arm 11 and that of the arm 12. In this variant, the reducer comprises a planetary gear train 68 which replaces the succession of straight gear trains 63 and 64.

Advantageously, the joint 13 connects two elements of the robot, and the components of the joint 13 are included in the volume of the elements and in a spherical volume 70 which is disposed between the two elements, the diameter of which is smaller than transverse dimensions d11 and d12 of the two elements.

More specifically, in the second embodiment, the reducer 53 can be contained in the spherical volume 70 which is situated between the arm 11 and the forearm 12, the diameter of the spherical volume 70 being smaller than transverse dimensions d11 and d12, respectively of the arm 11 and of the forearm 12. This greatly reduced spherical volume 70 prevents any projection from the joint 13 which could impede the movements of the robot. The spherical volume 70 with reduced dimensions also exists in the first embodiment. In the variant shown in FIG. 6, the planetary gear train 68 makes it possible to reduce the spherical volume 70.

We therefore claim:

1. A joint connecting two elements, said joint comprising:
   two pivot connections, a first one of said pivot connections establishing a first pivot axis, and a second one of said pivot connections establishing a second pivot axis such that said first pivot axis is not parallel to said second pivot axis,
   a first motor having a first drive axis, said first motor including a first stator portion disposed in fixed relation to a first one of said elements and a first drive portion connected to an input of a first speed reducer having parallel input and output axes, and
   a second motor having a second drive axis that is always parallel to said first drive axis of said first motor, said second motor including a second stator portion connected to an output portion of said first speed reducer for common axial rotation therewith about said first pivot axis, and a second drive portion connected to another input of a second speed reducer, said second speed reducer including a bevel gear and having an output disposed in fixed relation to said second element, wherein said first one and said second one of said two elements rotate about said first pivot axis in response to an operation of said first motor, and in response to another operation of said second motor rotate with respect to one another about said second pivot axis.

2. The joint as claimed in claim 1, wherein the bevel gear comprises a face gear.

3. The joint as claimed in claim 1, wherein one of the reducers comprises a planetary gear train.

4. The joint as claimed in claim 1, wherein the reducers are reversible.

5. A humanoid robot, comprising at least one joint as claimed in claim 1.

6. The humanoid robot as claimed in claim 5, wherein the two elements connected by the at least one joint are two elements of the robot, and wherein the components of the joint are included in the volume of the elements and in a spherical volume which is disposed between the two elements, wherein the diameter of the spherical volume is smaller than transverse dimensions of the two elements.

* * * * *